9021X
L. Fisk,
Saw,
Patented Aug. 17, 1835.
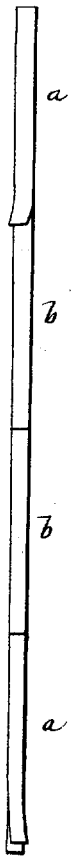
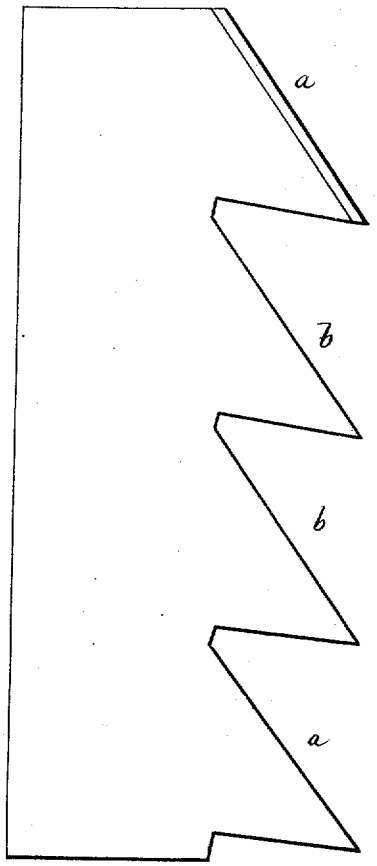
AM. PHOTO-LITHO. CO. N.Y. (OSBORNE'S PROCESS)

Aug 17, 1835 9021X 41.

Levi Fisk, Schroon New York.

Letters Patent.

The Schedule referred to in these Letters Patent and making part of the same, containing a description in the words of the said Levi Fisk, himself of his improvement in the Saw Mill Saw.

To all to whom these presents shall come. Be it known that I Levi Fisk, of Schroon, County of Essex and State of New York, have invented a new & useful improvement in the Saw Mill Saw, & the following is a full and exact description of the construction & operation of said improvement as invented by me, to wit, The improvement consists in combining the use of the plane with that of the saw for the purpose of shaving or plaining the lumber, at the time of sawing the same. 1. As to the process or application of this invention, Take a common Saw Mill Saw. of the usual construction and sharpen or file to an edge every third tooth or more or less upon the upper side of said tooth. The teeth so sharpened being brought to an edge alternately on opposite sides of the saw, so as to operate like a plane or shave in smoothing the lumber. I has been ascertained by several experiments that the sharpening [illegible] obliquely, the third tooth, answers a better purpose than the substitution of another tooth thus leaving two teeth of the usual form, between the planes or teeth sharpened to an edge which destroys that tendency to "comb" that would occur were all the teeth of the saw or any number more than one in a place so sharpened. The inside corner being cut off, the planes or sharpened teeth are set out (as near the root of the teeth as is convenient) with a set or hammer (in top of the teeth

9021X teeth only) so as to correspond with the set of common
teeth, that is the planes or sharpened teeth are, the whole
extent of the saw, set out in their tops as far as the
common teeth at their points. The points of the planes or
sharpened teeth are drawn in a very little, say a quarter
of an inch from their points. said planes or sharpened
teeth are filed obliquely on their top, leaving the cut corner
the longest, after which the file is drawn lightly on the
outside, the end of the file bearing lightly against the
plate, so as to render the edge formed on the top perfectly
true, - which is parallel with the plate. the bottom of
these teeth sustain no material alteration, except by their
being drawn in a little at their points, for the purpose of
affecting the top of the plane or sharpened tooth as above
mentioned. The other teeth do not require quite so much
set as is usual leaving the planes or edged teeth out the
most. The operation of a saw with this improvement is in
the usual manner; & while it cuts as the common saw in the downward
stroke, its returning or upward motion causes the planes or edged
teeth to take off thin shavings neatly cut off at both ends, leaving the
lumber unusually smooth, causing the edges, particularly the under
edge, to be much smoother that when sawed by the common saw, I am
aware that the simple cutters or smoothers is not a new inven=
tion & I therefore lay no claim to them as they have been applied
edgeways to the side of the saw, but a saw of the above described
construction runs much straighter than the common one or
that slightly improved and according to this combined prin=
ciple, the planes or shaving teeth cut the most on the side where
there is the most pressure; & all "ribbing" which is usually left
on lumber is entirely or rather nearly altogether prevented, by the
operation of this saw, & more lumber in a given time may be cut by
it than can be performed by the common saw, for a further illustration
of my invention reference is made to the model & drawing depo
sited 9021X 43 deposited in the Patent office. what I claim as my invention and for which I solicit Letters Patent is the upper oblique edge of saw teeth being cut to the right & left alternately & set together, or betwixt any number of common teeth, for the upward motion of the saw, for the purpose of sawing wood in a smooth manner, as above described.

Witnesses

Benj. Kurtz
Andrew Harper

Levi Fisk

Exa
W.G.

528 [illegible]

Drawing Made